(12) United States Patent
Ohori et al.

(10) Patent No.: US 11,128,181 B2
(45) Date of Patent: Sep. 21, 2021

(54) CONTACTLESS POWER FEEDING SYSTEM AND CONTACTLESS POWER TRANSFER SYSTEM

(71) Applicant: Panasonic Intellectual Property Management Co., Ltd., Osaka (JP)

(72) Inventors: Takahiro Ohori, Osaka (JP); Hideki Tamura, Shiga (JP); Yusuke Tanji, Osaka (JP); Shingo Okaura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 397 days.

(21) Appl. No.: 16/305,659

(22) PCT Filed: Feb. 2, 2017

(86) PCT No.: PCT/JP2017/003764
§ 371 (c)(1),
(2) Date: Nov. 29, 2018

(87) PCT Pub. No.: WO2017/208498
PCT Pub. Date: Dec. 7, 2017

(65) Prior Publication Data
US 2020/0328618 A1 Oct. 15, 2020

(30) Foreign Application Priority Data
May 30, 2016 (JP) .............................. JP2016-107869

(51) Int. Cl.
*B60M 7/00* (2006.01)
*B60L 50/60* (2019.01)
(Continued)

(52) U.S. Cl.
CPC .............. *H02J 50/80* (2016.02); *B60L 50/60* (2019.02); *B60L 53/122* (2019.02); *B60M 7/00* (2013.01);
(Continued)

(58) Field of Classification Search
CPC .. B60M 7/00; H02J 50/80; H02J 50/12; H02J 7/00032; H02J 2207/20; B60L 50/60; B60L 53/122; B60L 2200/12
See application file for complete search history.

(56) References Cited

U.S. PATENT DOCUMENTS

2014/0084858 A1 3/2014 Kim et al.
2014/0139035 A1 5/2014 Ishihara et al.
(Continued)

FOREIGN PATENT DOCUMENTS

JP  2013-192326 A  9/2013
JP  2014-103751 A  6/2014
(Continued)

OTHER PUBLICATIONS

Extended European Search Report issued in Application No. 17806060.4 dated Jan. 24, 2019.
(Continued)

*Primary Examiner* — Carlos Amaya
(74) *Attorney, Agent, or Firm* — McDermott Will & Emery LLP (57) ABSTRACT

A contactless power feeding system includes: a primary circuit for supplying primary power to a power feeding coil; and a primary control circuit for controlling the primary circuit. The primary control circuit acquires, from a secondary control circuit, a secondary measured value and a secondary target value of secondary power received by a power receiving coil. The primary control circuit performs control processing and update processing alternately and
(Continued)

repeatedly. The control processing is processing of controlling the primary circuit to bring the primary measured value into conformity with a primary target value. The update processing is processing of updating the primary target value. The update processing includes processing of calculating the primary target value based on transfer efficiency to be determined by the primary measured value and the secondary measured value and on the secondary target value.

8 Claims, 6 Drawing Sheets

(51) Int. Cl.
    *B60L 53/122*     (2019.01)
    *H02J 50/80*     (2016.01)
    *H02J 50/12*     (2016.01)
    *H02J 7/00*     (2006.01)

(52) U.S. Cl.
    CPC .......... *H02J 7/00032* (2020.01); *H02J 50/12* (2016.02); *H02J 2207/20* (2020.01)

(56) References Cited

U.S. PATENT DOCUMENTS

| | | | |
|---|---|---|---|
| 2015/0028691 A1 | 1/2015 | Yamauchi et al. | |
| 2015/0303714 A1* | 10/2015 | Keeling | B60L 53/122 320/108 |
| 2017/0063167 A1 | 3/2017 | Uchida | |
| 2017/0346349 A1* | 11/2017 | Shimokawa | H02J 50/12 |

FOREIGN PATENT DOCUMENTS

| | | |
|---|---|---|
| JP | 2014-176173 A | 9/2014 |
| JP | 2015-089221 A | 5/2015 |
| WO | 2015/177860 A1 | 11/2015 |

OTHER PUBLICATIONS

International Search Report issued in Application No. PCT/JP2017/003764 dated Mar. 14, 2017, with English translation.

* cited by examiner

CONTACTLESS POWER FEEDING SYSTEM AND CONTACTLESS POWER TRANSFER SYSTEM

RELATED APPLICATIONS

This application is the U.S. National Phase under 35 U.S.C. § 371 of International Application No. PCT/JP2017/003764, filed on Feb. 2, 2017, which in turn claims the benefit of Japanese Application No. 2016-107869, filed on May 30, 2016, the disclosures of which are incorporated by reference herein.

TECHNICAL FIELD

The present invention generally relates to a contactless power feeding system and a contactless power transfer system, and more particularly relates to a contactless power feeding system and contactless power transfer system for transferring power in a contactless manner to an object to be supplied with power.

BACKGROUND ART

A power feeding device has been known in the art which has the ability to supply power to a power receiving device in a contactless manner. A power feeding device of this type is disclosed, for example, in Patent Literature 1. The power feeding device includes a power transmitting unit, a first acquisition means, a control means, a second acquisition means, and a correction means.

The power transmitting unit is arranged to face a power receiving unit of the power receiving device over a space. The first acquisition means acquires, every first cycle time, a first characteristic value representing power to be supplied to the power transmitting unit. The control means controls, based on the first characteristic value, the power to be supplied to the power transmitting unit such that the power becomes closer toward a first instruction value. The second acquisition means acquires, every second cycle time, a second instruction value transmitted from the power receiving device and a second characteristic value representing the power received at the power receiving unit. Then, the correction means corrects the first instruction value in accordance with the second instruction value and the second characteristic value.

The known power feeding device, however, corrects the first instruction value (corresponding to a primary target value) based on only the second instruction value (corresponding to a secondary target value) and the second characteristic value (corresponding to a secondary measured value). Thus, it is difficult for the known device to quickly bring the secondary measured value closer to the secondary target value.

CITATION LIST

Patent Literature

Patent Literature 1: JP 2015-89221 A

SUMMARY OF INVENTION

In view of the foregoing background, it is therefore an object of the present invention to provide a contactless power feeding system and contactless power transfer system that facilitate bringing the secondary measured value closer to the secondary target value quickly.

A contactless power feeding system according to an aspect of the present invention includes a primary circuit and a primary control circuit. The primary circuit supplies primary power to a power feeding coil. The primary control circuit controls the primary circuit. The primary control circuit is configured to acquire a primary measured value as a measured value of the primary power. The primary control circuit is configured to acquire a secondary measured value and a secondary target value from a secondary control circuit. The secondary measured value is a measured value of secondary power received by a power receiving coil to be electromagnetically coupled to the power feeding coil. The secondary target value is a target value of the secondary power. The primary control circuit is configured to perform control processing and update processing alternately and repeatedly. The control processing is processing of controlling the primary circuit to bring the primary measured value into conformity with a primary target value that is a target value of the primary power. The update processing is processing of updating the primary target value. The update processing includes processing of calculating the primary target value based on transfer efficiency to be determined by the primary measured value and the secondary measured value and on the secondary target value.

A contactless power transfer system according to another aspect of the present invention includes the contactless power feeding system described above; a power feeding coil, a power receiving coil, and a secondary control circuit. The power feeding coil is supplied with the primary power. The power receiving coil is electromagnetically coupled to the power feeding coil. The secondary control circuit is configured to acquire a secondary measured value as a measured value of secondary power to be supplied to the power receiving coil. The secondary control circuit is configured to transmit the secondary measured value and a secondary target value to the primary control circuit. The secondary target value is a target value of the secondary power.

DESCRIPTION OF EMBODIMENTS

Contactless power feeding systems and contactless power transfer systems according to first and second embodiments of the present invention will be described below. Note that the configurations to be described below are only exemplary embodiments of the present invention. Those configurations should not be construed as limiting the scope of the present invention but may be modified in various manners depending on design choice or any other factor without departing from the true spirit and scope of the invention.

First Embodiment

Figure 1A:
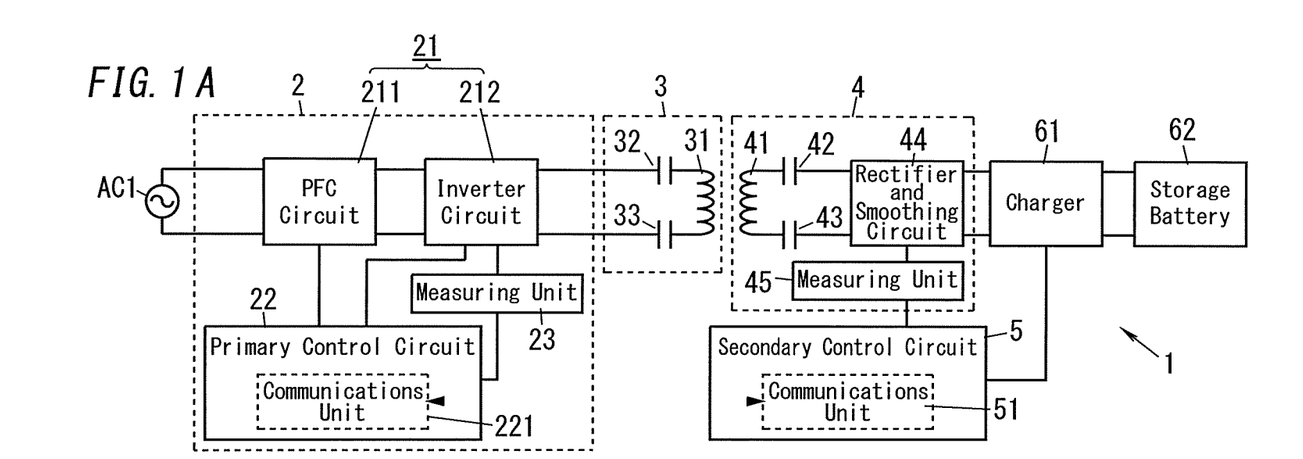
FIG. 1A is a block diagram of a contactless power feeding system and contactless power transfer system according to a first embodiment of the present invention.

A contactless power feeding system 2 according to a first embodiment of the present invention includes a primary circuit 21 and a primary control circuit 22 as shown in FIG. 1A. The primary circuit 21 supplies primary power to a power feeding coil 31. The primary control circuit 22 controls the primary circuit 21. The primary control circuit 22 is configured to acquire a primary measured value as a measured value of the primary power. The primary control circuit 22 is configured to acquire, from a secondary control circuit 5, a secondary measured value, which is a measured value of secondary power to be received by a power receiving coil 41 to be electromagnetically coupled to the power feeding coil 31, and a secondary target value, which is a target value of the secondary power.

Figure 1B:
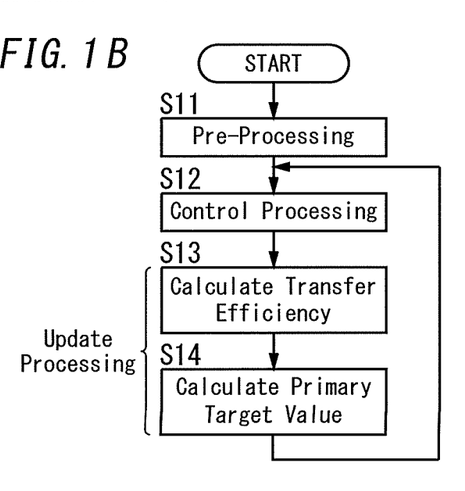
FIG. 1B is a flowchart showing how the contactless power feeding system operates.

As shown in FIG. 1B, the primary control circuit 22 is configured to perform control processing and update processing alternately and repeatedly. The control processing is processing of controlling the primary circuit 21 to bring the primary measured value into conformity with a primary target value that is a target value of the primary power. The update processing is processing of updating the primary target value. The update processing includes processing of calculating the primary target value based on transfer efficiency to be determined by the primary measured value and the secondary measured value and on the secondary target value.

Meanwhile, a contactless power transfer system 1 according to this embodiment includes the contactless power feeding system 2, the power feeding coil 31, the power receiving coil 41, and the secondary control circuit 5 as shown in FIG. 1A. The power feeding coil 31 is supplied with the primary power. The power receiving coil 41 is electromagnetically coupled to the power feeding coil 31. The secondary control circuit 5 is configured to acquire a secondary measured value as a measured value of secondary power to be supplied to the power receiving coil 41. The secondary control circuit 5 is configured to transmit the secondary measured value and a secondary target value, which is a target value of the secondary power, to the primary control circuit 22.

The contactless power feeding system 2 and contactless power transfer system 1 according to this embodiment will be described in detail with reference to FIGS. 1A-3. The contactless power transfer system 1 according to this embodiment includes a body unit 20 (see FIG. 2), a power feeding unit 3 including the power feeding coil 31, a power receiving unit 4 including the power receiving coil 41, and the secondary control circuit 5. The power receiving unit 4 is configured to be supplied with output power in a contactless manner from the body unit 20. The output power is power to be supplied in a contactless manner from the power feeding coil 31 to the power receiving coil 41 upon the application of an AC voltage from the body unit 20 to the power feeding coil 31.

In the following description of this embodiment, a situation where the power receiving unit 4 is provided as an onboard unit for a vehicle 6 will be described as an example.

Also, in the example to be described below, a charger 61 and a storage battery (battery) 62 also provided as onboard units for the vehicle 6 are supposed to be loads. In this example, the vehicle 6 may be an electrically driven vehicle to be powered by the electric energy stored in the storage battery 62. In the following description, an electric vehicle to travel on the driving force generated by an electric motor will be described as an exemplary electrically driven vehicle. However, this is only an example and should not be construed as limiting. Examples of electrically driven vehicles include hybrid electric vehicles, motorcycles (such as electric scooters), and electric bicycles.

The body unit 20 receives power supplied from a commercial power supply (utility power grid) or a power generation facility such as a solar power generator, and supplies output power to the power receiving unit 4 in a contactless manner. In the following description of this embodiment, the body unit 20 is supplied with AC power from a commercial power supply AC1. Alternatively, the body unit 20 may also be supplied with DC power from a DC power supply.

Figure 2:
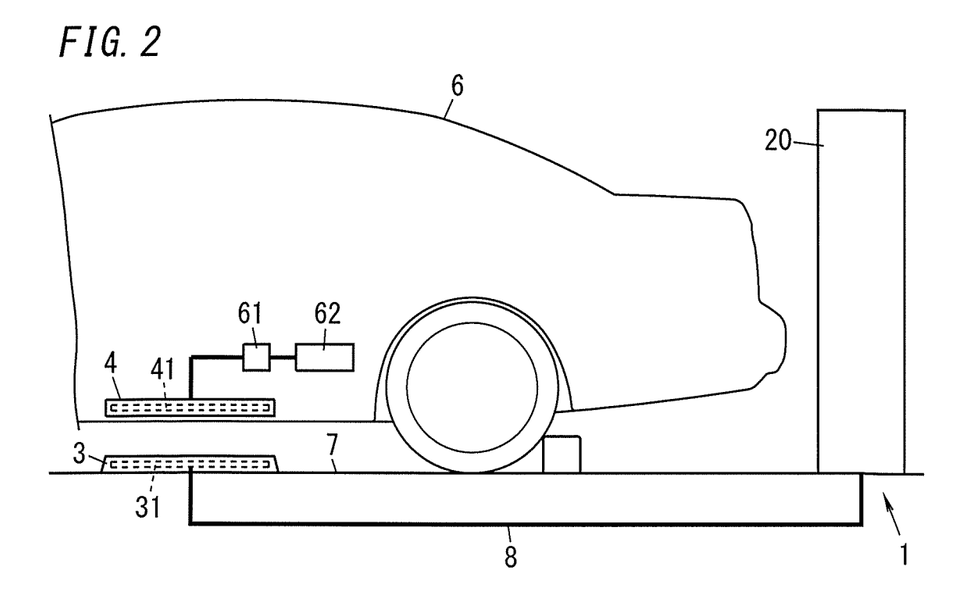
FIG. 2 is a schematic representation illustrating an exemplary application of the contactless power feeding system.

The body unit 20 may be, for example, a charging station to be installed in a parking lot of a commercial facility, a public facility, or a multi-family dwelling house. The power feeding unit 3 may be installed on an installation surface 7 such as the floor or ground of the parking lot. Also, the body unit 20 is electrically connected to the power feeding unit 3 via a cable 8 buried in the ground.

The body unit 20 supplies output power in a contactless manner to the power receiving unit 4 of the vehicle 6 parked over the power feeding unit 3. At this time, the power receiving coil 41 of the power receiving unit 4 is located over, and thereby electromagnetically coupled (i.e., electrically and/or magnetically coupled) to, the power feeding coil 31. In this example, the power feeding coil 31 is installed to be exposed on the installation surface 7. However, this is only an example and should not be construed as limiting. Alternatively, the power feeding coil 31 may also be installed to be buried under the installation surface 7. That is to say, the power feeding unit 3 may be installed to be buried under the installation surface 7.

The body unit 20 is formed by housing the primary circuit 21, the primary control circuit 22, and a measuring unit (primary measuring unit) 23 in a housing, for example, as shown in FIG. 1A. The primary circuit 21 and the primary control circuit 22 together form the contactless power feeding system 2. In other words, the contactless power feeding system 2 according to this embodiment includes the primary circuit 21 and the primary control circuit 22.

The primary circuit 21 includes a power factor correction (PFC) circuit 211 and an inverter circuit 212. The PFC circuit 211 converts an AC voltage supplied from the commercial power supply AC1 into a DC voltage and supplies the DC voltage thus converted to the inverter circuit 212. The inverter circuit 212 converts the DC voltage supplied from the PFC circuit 211 into an AC voltage and applies the AC voltage thus converted to the power feeding coil 31. That is to say, the primary circuit 21 receives the AC power supplied from the commercial power supply AC1 and applies the AC voltage to the power feeding coil 31 under the control of the primary control circuit 22. In other words, the primary circuit 21 supplies power to the power feeding unit 3 (power feeding coil 31) under the control of the primary control circuit 22.

The measuring unit 23 has the function of measuring an input voltage of the inverter circuit 212 and an input current of the inverter circuit 212. The measuring unit 23 also has the function of calculating power based on the voltage and current thus measured. That is to say, the measuring unit 23 has the function of measuring the power to be input to the inverter circuit 212. Also, since the power loss caused by the PFC circuit 211 is normally less than the power input to the PFC circuit 211, the power input to the PFC circuit 211 is roughly equal to the power input to the inverter circuit 212. Thus, since the measuring unit 23 has the function of measuring the power input to the inverter circuit 212, it can be said that the measuring unit 23 has the function of measuring the power input to the PFC circuit 211, i.e., the power input to the contactless power feeding system 2. Also, since the measuring unit 23 has the function of measuring the power input to the contactless power feeding system 2, it can be said that the measuring unit 23 substantially has the function of measuring the primary power to be supplied from the primary circuit 21 to the power feeding coil 31. That is to say, the measuring unit 23 may be called a primary measuring unit for measuring the primary power. Note that the function of measuring the primary power may be implemented by any known technology, and description thereof will be omitted herein. The measured value of the primary power is given to the primary control circuit 22. That is to say, the primary control circuit 22 is configured to acquire the measured value of the primary power. In the following description, the "measured value of the primary power" will be hereinafter simply referred to as a "primary measured value." Although the measuring unit 23 is provided separately in this embodiment from the primary control circuit 22, the measuring unit 23 may be included in the primary control circuit 22 as well.

The primary control circuit 22 includes, as its major component, a microcomputer. The microcomputer performs the function as the primary control circuit 22 by having a program stored in its memory executed by a central processing unit (CPU). Note that the program may be written in advance in the memory of the microcomputer but may also be provided by being stored on some storage medium such as a memory card or be downloaded through a telecommunications line.

The primary control circuit 22 is configured to control the primary circuit 21. Specifically, the primary control circuit 22 controls the primary circuit 21 such that an AC voltage is applied to the power feeding coil 31, thereby having power fed from the power feeding coil 31 to the power receiving coil 41 in a contactless manner. That is to say, the primary control circuit 22 controls feeding of power from the power feeding coil 31 provided on the primary side to the power receiving coil 41 provided on the secondary side and electromagnetically coupled to the power feeding coil 31.

In this embodiment, the primary control circuit 22 is configured to perform power control processing and update processing alternately and repeatedly. The power control processing is processing of controlling the primary circuit 21 to bring the primary measured value into conformity with a primary target value that is a target value of the primary power. The update processing is processing of updating the primary target value. That is to say, the primary control circuit 22 is configured to perform feedback control of the primary power while updating the primary target value on a regular basis.

The primary control circuit 22 includes a communications unit 221. The communications unit 221 is configured to communicate wirelessly with a communications unit 51 of the secondary control circuit 5 (to be described later) in compliance with a communications standard such as a standard for a Wi-Fi® authorized wireless local area network (LAN) or Bluetooth®. Alternatively, the communication between the communications units 221 and 51 may also be a wireless communication compliant with any other communications standard.

The power feeding unit 3 includes the power feeding coil 31 and a pair of capacitors 32, 33 as shown in FIG. 1A. The power feeding coil 31 may be implemented, for example, as a so-called "circular (or spiral) coil" in which an electrically conductive wire is wound spirally in a plan view. The power feeding coil 31 and the pair of capacitors 32, 33 together form a resonant circuit.

The power receiving unit 4 includes the power receiving coil 41 to be electromagnetically coupled to the power feeding coil 31, a pair of capacitors 42, 43, a rectifier and smoothing circuit 44, and a measuring unit (secondary measuring unit) 45 as shown in FIG. 1A. A charger 61 and a storage battery 62 are electrically connected to output terminals of the power receiving unit 4. The power receiving coil 41, as well as the power feeding coil 31, may be implemented as a circular coil, for example. The power receiving coil 41 and the pair of capacitors 42, 43 together form a resonant circuit. The rectifier and smoothing circuit 44 rectifies and smooths out an AC voltage generated between the terminals of the power receiving coil 41. Then, the rectifier and smoothing circuit 44 outputs a DC voltage, obtained by rectifying and smoothing the AC voltage, to the charger 61 and the storage battery 62.

The measuring unit 45 has the function of measuring an output voltage of the rectifier and smoothing circuit 44 and an output current of the rectifier and smoothing circuit 44. The measuring unit 45 also has the function of calculating power based on the voltage and current thus measured. That is to say, the measuring unit 45 has the function of measuring the power output from the rectifier and smoothing circuit 44. In other words, the measuring unit 45 has the function of measuring the power output by the power receiving unit 4. In addition, since the measuring unit 45 has the function of measuring the power output by the power receiving unit 4, it can be said that the measuring unit 45 substantially has the function of measuring the secondary power received by the power receiving coil 41. That is to say, the measuring unit 45 may be called a secondary measuring unit for measuring the secondary power. Note that the function of measuring the secondary power may be implemented by any known technology, and description thereof will be omitted herein. The measured value of the secondary power is given to the secondary control circuit 5. Stated otherwise, the secondary control circuit 5 is configured to acquire the measured value of the secondary power. In the following description, the "measured value of the secondary power" will be hereinafter simply referred to as a "secondary measured value."

The secondary control circuit 5 is a control circuit, such as an electronic control unit (ECU), provided as an onboard unit for the vehicle 6. The secondary control circuit 5 acquires the state of charge (SOC) of the storage battery 62 via the charger 61 and determines a secondary target value, which is a target value of the secondary power. Then, the secondary control circuit 5 transmits the secondary measured value acquired from the measuring unit 45 and the secondary target value to the primary control circuit 22 via the communications units 51 and 221. In other words, the primary control circuit 22 is configured to acquire the secondary measured value and the secondary target value from the secondary control circuit 5. In this embodiment, the secondary control circuit 5 transmits the secondary measured value and the secondary target value to the primary control circuit 22 at predetermined transmission intervals.

The contactless power transfer system 1 according to this embodiment adopts the magnetic field resonance method (also called "magnetic resonance method") for transferring power by triggering resonance between a resonant circuit including the power feeding coil 31 and a resonant circuit including the power receiving coil 41. Thus, even when there is a relatively long distance between the power feeding coil 31 and the power receiving coil 41, the contactless power transfer system 1 according to this embodiment is still able to transfer the output power of the body unit 20 to the power receiving unit 4 with high efficiency. The method for transferring output power from the body unit 20 to the power receiving unit 4 does not have to be the magnetic field resonance method but may also be an electromagnetic induction method or a microwave transmission method, for example.

<Operation>

Next, it will be described with reference to FIG. 1B how the contactless power feeding system 2 according to this embodiment operates. First of all, on receiving, from the vehicle 6, an instruction that power feeding be started, the primary control circuit 22 performs pre-processing of calculating a primary target value (in Step S11). This pre-processing is performed before the control processing is performed for the first time since the power has started to be fed from the power feeding coil 31 to the power receiving coil 41. During this pre-processing, the primary control circuit 22 acquires a secondary target value transmitted from the secondary control circuit 5. Then, the primary control circuit 22 calculates the primary target value based on the secondary target value and the transfer efficiency.

As used herein, the transfer efficiency is the ratio of the power received by the power receiving coil 41 (i.e., the secondary power) to the power output by the power feeding coil 31 (i.e., the primary power). For example, if the primary power and the secondary power have the same magnitude, then the transfer efficiency is 100%. Also, if the magnitude of the secondary power is a half of the magnitude of the primary power, then the transfer efficiency is 50%.

Supposing the primary target value, the secondary target value, and the transfer efficiency are designated by CP1, CP2, and η, respectively, the primary target value may be given by CP1=CP2/η using the secondary target value and the transfer efficiency. In the pre-processing, the primary control circuit 22 calculates the primary target value with the transfer efficiency set at an initial value. The initial value is a constant set in advance for the primary control circuit 22. The initial value is suitably a maximum value (of, e.g., 95%), permitted by the contactless power feeding system 2, of the transfer efficiency. Furthermore, the initial value is suitably as close to 100% as possible. In this embodiment, the initial value is supposed to be 100%.

After having performed the pre-processing, the primary control circuit 22 performs control processing (in Step S12). Specifically, the primary control circuit 22 controls the primary circuit 21 to bring the primary measured value into conformity with the primary target value calculated during the pre-processing. Once the control processing has started to be performed, power starts to be supplied in a contactless manner from the power feeding coil 31 to the power receiving coil 41. Then, the measuring unit 45 comes to measure the output power of the power receiving unit 4 and the secondary control circuit 5 comes to acquire a secondary measured value. Thus, on and after the control processing has been performed for the first time since the power has started to be fed, the primary control circuit 22 comes to acquire not only the secondary target value but also the secondary measured value from the secondary control circuit 5.

The primary control circuit 22 performs the update processing after having performed the control processing. First of all, the primary control circuit 22 calculates transfer efficiency based on the primary measured value acquired from the measuring unit 23 and the secondary measured value acquired from the secondary control circuit 5 (in Step S13). Supposing the primary measured value and secondary measured value are designated by P1 and P2, respectively, the transfer efficiency is given by r=P2/P1 using the primary measured value and the secondary measured value. Next, the primary control circuit 22 calculates the primary target value based on the transfer efficiency thus calculated and the secondary target value acquired from the secondary control circuit 5 (in Step S14). The method of calculating the primary target value during the update processing is the same as the method of calculating the primary target value during the pre-processing, except that the transfer efficiency is not an initial value but the calculated one. That is to say, the primary control circuit 22 updates the primary target value by performing the processing steps S13 and S14.

Then, after having performed the update processing, the primary control circuit 22 performs the control processing all over again (in Step S12). That is to say, the primary control circuit 22 performs the control processing (Step S12) and the update processing (Steps S13 and S14) alternately and repeatedly based on the primary target value that has been updated. The update processing is performed based on the secondary measured value and secondary target value acquired from the secondary control circuit 5. Thus, the interval at which the update processing is performed depends on the interval at which the secondary measured value and the secondary target value are transmitted intermittently from the secondary control circuit 5. In this embodiment, the interval at which the update processing is performed may be several hundred ms, for example. In this manner, the primary control circuit 22 operates to bring the secondary measured value into conformity with the secondary target value by increasing or decreasing the primary power while updating the primary target value based on the secondary target value and the secondary measured value.

Also, in this embodiment, the primary control circuit 22 monitors a variation in the primary measured value during the control processing. When finding that the primary measured value has varied to deviate from a predetermined range (of, e.g., ±5%) defined with respect to the primary target value as a median, the primary control circuit 22 decides that an error should have occurred and controls the primary circuit 21 to stop feeding power. In addition, when finding the primary measured value greater than rated power (of, e.g., 3.7 kW), the primary control circuit 22 also decides that an error should have occurred and controls the primary circuit 21 to stop feeding power.

Unlike the update processing, the control processing may be performed with neither the secondary measured value nor the secondary target value acquired from the secondary control circuit 5. That is why even though the interval at which the update processing is performed depends on the interval at which the secondary measured value and the secondary target value are transmitted, the interval at which the control processing is performed does not depend on the transmission interval. Thus, the control processing may be done more quickly than the update processing. Also, during this control processing to be done relatively quickly, the primary control circuit 22 monitors a variation in the primary measured value at intervals shorter than the transmission intervals. Therefore, the contactless power feeding system 2 according to this embodiment is able to respond quickly enough to a variation in primary power involved with a variation in loads (e.g., the charger 61 and the storage battery 62 in this example) and a variation in the coefficient of coupling between the power feeding coil 31 and the power receiving coil 41. The coefficient of coupling between the power feeding coil 31 and the power receiving coil 41 may vary when the vehicle 6 moves while being fed with power, for example.

Turning now to known contactless power feeding systems such as the one briefly mentioned in the background section (hereinafter referred to as a "comparative contactless power feeding system"), the comparative contactless power feeding system could cause the following problems. Note that the comparative contactless power feeding system is supposed to have the same configuration as the contactless power feeding system according to this embodiment except that the primary control circuit thereof has a different configuration from the primary control circuit 22.

In the comparative contactless power feeding system, the primary control circuit performs correction processing of correcting the primary target value based on the difference between the secondary measured value and the secondary target value during the processing of controlling the primary power. However, in this correction processing, the relation between the primary measured value and the secondary measured value (i.e., the transfer efficiency) is not taken into account. Therefore, since the transfer efficiency is unknown according to the comparative contactless power feeding system, there are no indices to the degree of correction to be made to the primary target value to bring the secondary measured value into conformity with the secondary target value. Consequently, in the comparative contactless power feeding system, the primary control circuit needs to perform the correction processing over and over again to bring the secondary measured value into conformity with the secondary target value. Therefore, it often takes some time before the secondary power is able to be supplied with good stability to the storage battery 62. This is a problem with the comparative contactless power feeding system.

Thus, in the contactless power feeding system 2 according to this embodiment, the primary control circuit 22 calculates, during the update processing, the transfer efficiency based on the primary measured value and the secondary measured value, and corrects the primary target value based on the transfer efficiency thus calculated. That is to say, the contactless power feeding system 2 according to this embodiment uses the transfer efficiency as indices to the degree of correction to be made to the primary target value in order to bring the secondary measured value into conformity with the secondary target value. Therefore, the contactless power feeding system 2 according to this embodiment does not need to repeat the correction processing over and over again unlike the comparative contactless power feeding system and shortens the amount of time it takes before the secondary power is able to be supplied with good stability to the storage battery 62. That is to say, the contactless power feeding system 2 according to this embodiment facilitates bringing the secondary measured value closer to the secondary target value quickly.

Next, the difference in operation between the contactless power feeding system 2 according to this embodiment and the comparative contactless power feeding system will be described by way of specific examples illustrated in FIGS. 3A and 3B. In each of FIGS. 3A and 3B, the ordinate indicates the power (the unit of which is kW) and the abscissa indicates the time (the unit of which is ms). In each of FIGS. 3A and 3B, the solid line graph represents the primary target value and the one-dot chain line graph represents the secondary target value. Furthermore, in each of FIGS. 3A and 3B, the open bar graphs represent primary measured values, and the dotted-hatched bar graphs represent secondary measured values confirmed by the primary control circuit 22.

In this specific example, the secondary target value is 3 kW. Also, in this specific example, the primary control circuit 22 (and the primary control circuit of the comparative example) acquires the secondary power and the secondary target value from the secondary control circuit 5 (and the secondary control circuit of the comparative example) every 500 ms. That is to say, the primary control circuit 22 and the primary control circuit of the comparative example each perform the update processing and the correction processing every 500 ms.

Figure 3A:
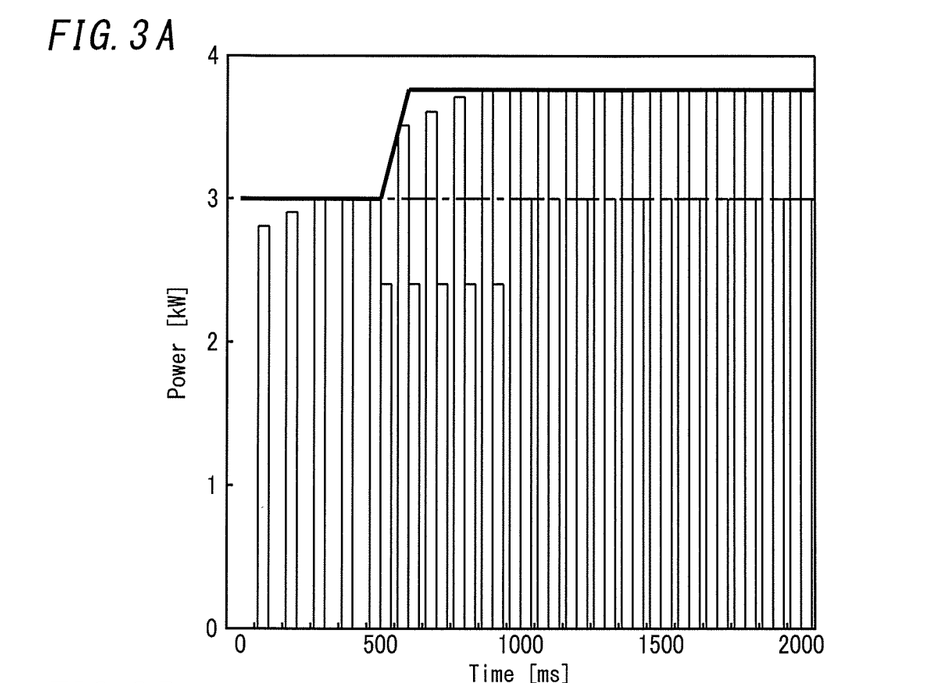
FIG. 3A shows a specific exemplary operation of the contactless power feeding system.
Figure 3B:
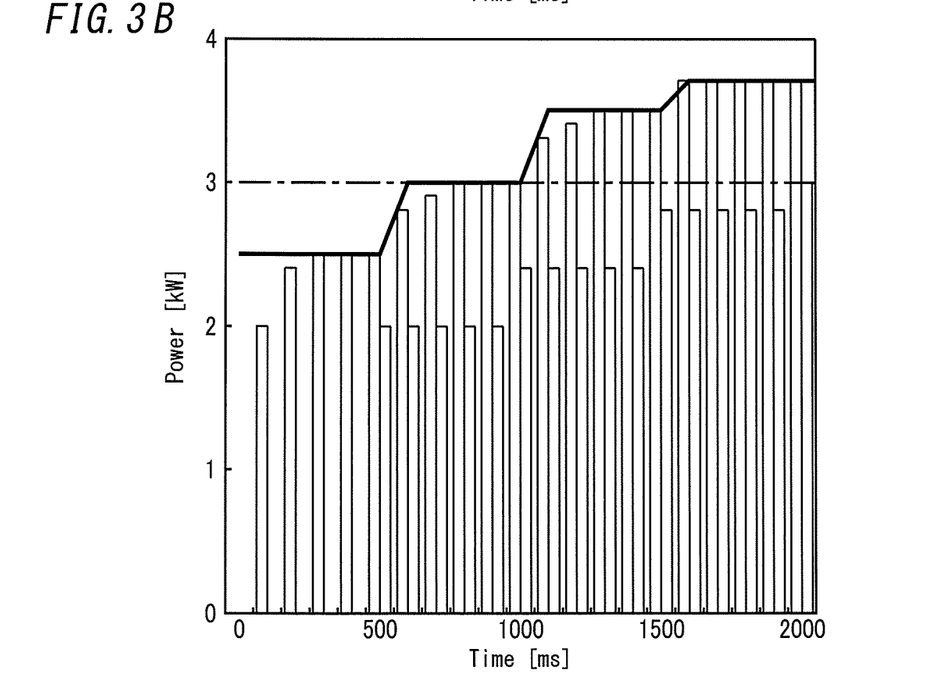
FIG. 3B shows a specific exemplary operation of a contactless power feeding system as a comparative example.

In the comparative contactless power feeding system, the primary control circuit acquires a secondary measured value and a secondary target value for the first time when 500 ms passes since the start of power feeding as shown in FIG. 3B, thereby performing the correction processing for the first time to increase the primary target value. Next, when 1000 ms passes since the start of power feeding, the primary control circuit acquires a secondary measured value and a secondary target value for the second time. At this point in time, however, the secondary measured value is still short of the secondary target value, and therefore, the primary control circuit performs the correction processing for the second time to increase the primary target value. Thereafter, in the comparative contactless power feeding system, it is not until the correction processing is done for the third time that the secondary measured value reaches the secondary target value. As can be seen, in the comparative contactless power feeding system, the primary control circuit performs the correction processing without calculating the transfer efficiency, and therefore, cannot help but increase the primary target value stepwise, every time the primary control circuit performs the correction processing.

In the contactless power feeding system 2 according to this embodiment, first of all, when 500 ms passes since the start of power feeding, the primary control circuit 22 acquires a secondary measured value and a secondary target value for the first time to perform update processing for the first time and increase the primary target value, as shown in FIG. 3A. Next, when 1000 ms passes since the start of power feeding, the primary control circuit 22 acquires a secondary measured value and a secondary target value for the second time. At this point in time, however, the secondary measured value has already reached the secondary target value. As can be seen, in the contactless power feeding system 2 according to this embodiment, the primary control circuit 22 performs the update processing while calculating the transfer efficiency, and therefore, is able to increase the secondary measured value to the secondary target value by performing the update processing only once.

In this specific example, the amount of time it takes for the secondary measured value to reach the secondary target value since the start of power feeding is 2000 ms in the comparative contactless power feeding system, but 1000 ms in the contactless power feeding system 2 according to this embodiment. As can be seen, the contactless power feeding system 2 according to this embodiment is able to bring the secondary measured value closer to the secondary target value more quickly than the comparative contactless power feeding system, and therefore, requires a shorter amount of time before the secondary power is able to be supplied with good stability to the storage battery 62.

In addition, in the contactless power feeding system 2 according to this embodiment, the primary control circuit 22 is configured to perform, before performing the control processing for the first time since the power has started to be fed from the power feeding coil 31 to the power receiving coil 41, the pre-processing of calculating the primary target value with the transfer efficiency set at an initial value. That is to say, in the contactless power feeding system 2 according to this embodiment, the primary control circuit 22 performs the pre-processing before starting to perform the update processing and the control processing alternately and repeatedly. In the specific example illustrated in FIG. 3A, the primary control circuit 22 performs the pre-processing with the transfer efficiency set at an initial value (of 100%), and therefore, the primary target value is equal to the secondary target value at a point in time when the power starts to be fed. Thus, the contactless power feeding system 2 according to this embodiment is able to bring the secondary measured value closer to the secondary target value with more reliability than in a situation where no pre-processing is performed. Note that the primary control circuit 22 may or may not perform the pre-processing before the control processing is performed for the first time since the start of power feeding.

Second Embodiment

A contactless power feeding system 2 according to a second embodiment of the present invention will be described with reference to FIGS. 4 to 6. Note that in the contactless power feeding system 2 according to the second embodiment, just the primary control circuit 22 has a different configuration from the primary control circuit 22 of the contactless power feeding system 2 according to the first embodiment. Thus, in the following description, any constituent member of the second embodiment having the same function as the counterpart of the contactless power feeding system 2 of the first embodiment will not be described again.

Figure 4:
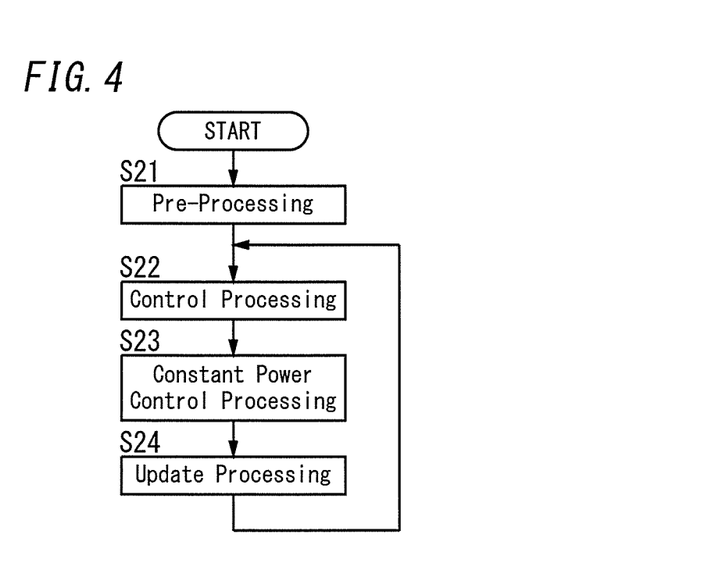
FIG. 4 is a flowchart showing how a contactless power feeding system according to a second embodiment of the present invention operates.
Figure 5:
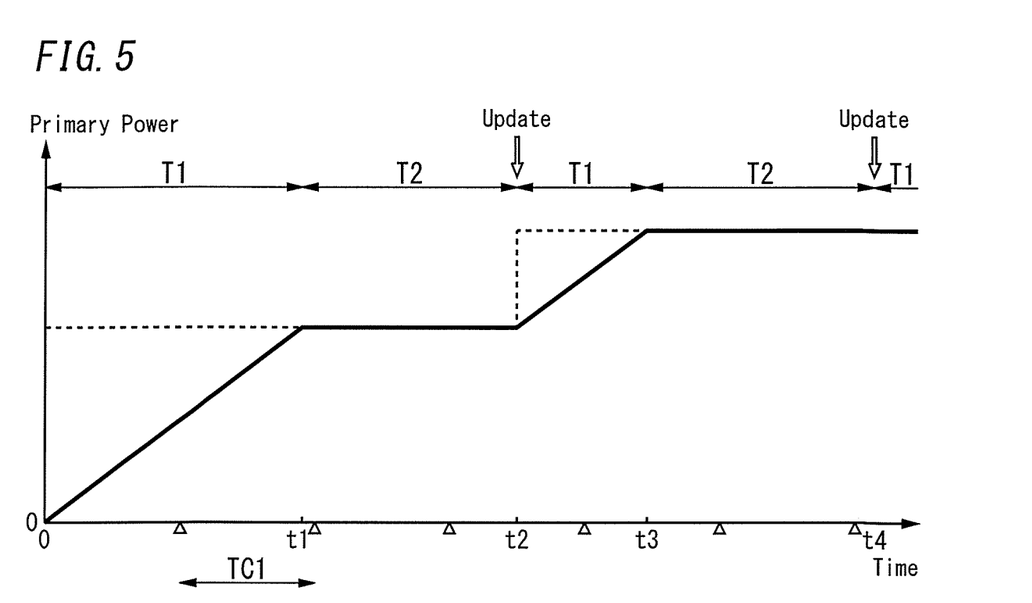
FIG. 5 shows how the contactless power feeding system operates.
Figure 6A:
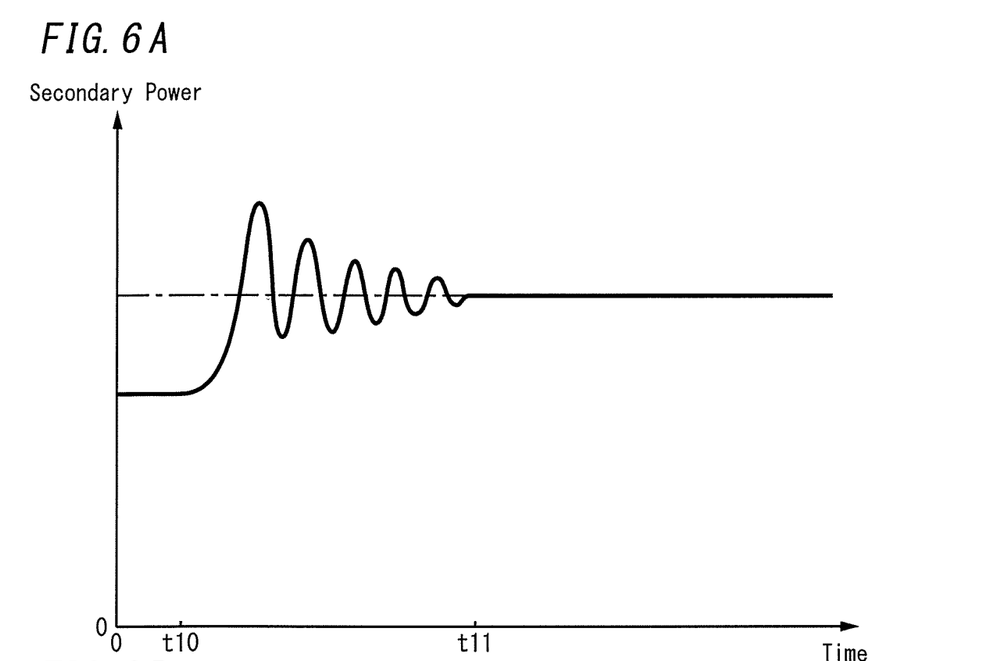
FIG. 6A shows how control is performed in a situation where transfer efficiency seems to be improperly calculated.
Figure 6B:
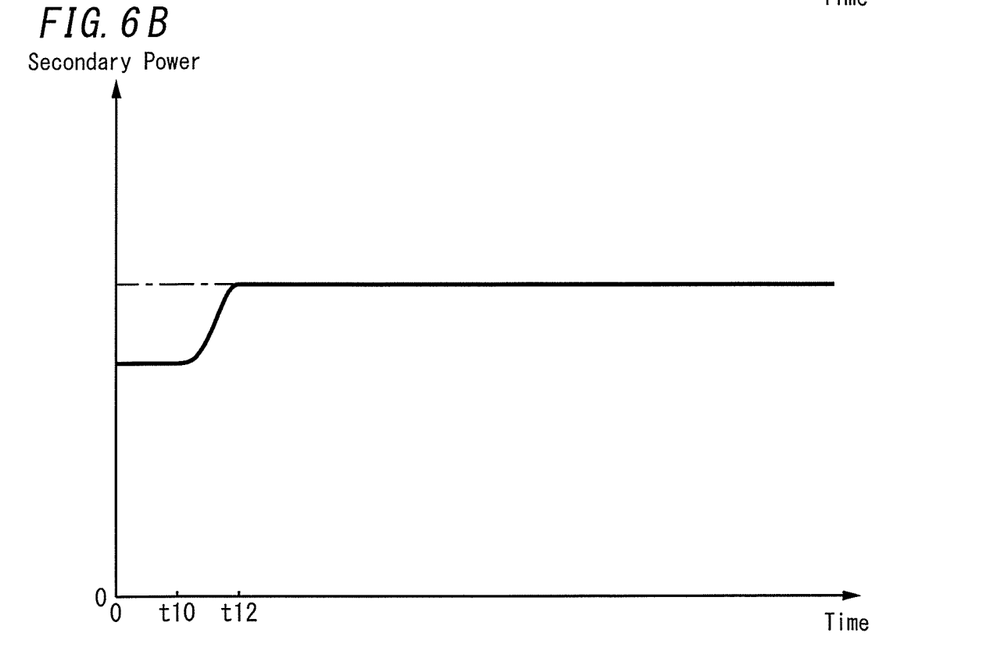
FIG. 6B shows how control is performed by the contactless power feeding system.

In the contactless power feeding system 2 according to this embodiment, the primary control circuit 22 controls the primary circuit 21 such that after the primary measured value has reached the primary target value and before the primary target value is updated, the primary measured value remains the primary target value yet to be updated (i.e., remains constant) for a predetermined period of time as shown in FIGS. 4 and 5. That processing to be performed by the primary control circuit 22 to control the primary circuit 21 such that the primary measured value remains constant for the predetermined period of time will be hereinafter referred to as "constant power control processing." In the contactless power feeding system 2 according to this embodiment, the primary control circuit 22 is configured to perform the control processing, the constant power control processing, and the update processing in this order repeatedly after power has started to be fed with the pre-processing done.

<Operation>

Next, it will be described with reference to FIGS. 4 and 5 how the contactless power feeding system 2 according to this embodiment operates. In FIG. 5, the ordinate indicates the primary power (the unit of which is kW, for example) and the abscissa indicates the time (the unit of which is ms, for example). Also, in FIG. 5, the solid line graph represents the primary measured value and the dotted line represents the primary target value. Furthermore, in FIG. 5, the open triangles on the axis of abscissas indicate the timings when the primary control circuit 22 acquires the secondary measured value and secondary target value from the secondary control circuit 5. In FIG. 5, the interval between two adjacent open triangles corresponds to a transmission interval at which the secondary measured value and secondary target value are transmitted intermittently from the secondary control circuit 5. In the following description, this interval will be hereinafter referred to as a "transmission interval TC1."

First of all, on receiving, from the vehicle 6, an instruction that power feeding be started, the primary control circuit 22 performs the pre-processing of calculating the primary target value in the same way as in the first embodiment (in Step S21). Next, after having performed the pre-processing, the primary control circuit 22 performs the control processing in the same way as in the first embodiment (in Step S22). In the following description, a period for which the control processing is performed will be hereinafter referred to as a "first period T1." That is to say, the primary control circuit 22 controls the primary circuit 21 to bring the primary measured value into conformity with the primary target value calculated during the pre-processing. In the example illustrated in FIG. 5, the primary measured value has reached the primary target value as a result of the control processing performed for the first period T1 from a time 0 through a time t1.

In addition, when the control processing is performed, power starts to be supplied in a contactless manner from the power feeding coil 31 to the power receiving coil 41. Thus, the primary control circuit 22 comes to acquire the secondary measured value, as well as the secondary target value, from the secondary control circuit 5.

After having performed the control processing and before performing update processing, the primary control circuit 22 performs constant power control processing (in Step S23). In the following description, a period for which the constant power control processing is performed will be hereinafter referred to as a "second period T2." That is to say, before performing the update processing, the primary control circuit 22 controls the primary circuit 21 for a predetermined period such that the primary measured value becomes equal to the primary target value yet to be updated. In the example illustrated in FIG. 5, during the second period T2 from the time t1 through a time t2, the primary measured value is maintained at a constant magnitude (i.e., equal to the primary target value yet to be updated). In this embodiment, the second period T2 (i.e., the period for which the constant power control processing is performed) is longer than the transmission interval TC1.

After having performed the constant power control processing, the primary control circuit 22 performs the update processing in the same way in the first embodiment (in Step S24). This update processing updates the primary target value. In the example illustrated in FIG. 5, no sooner the constant power control processing ends at the time t2 than the update processing is performed immediately to update the primary target value into a value greater than the previous one. Note that the amount of time it takes to have the update processing done is much shorter than the first period T1 or the second period T2, the period for performing the update processing is not shown in FIG. 5.

Then, after having performed the update processing, the primary control circuit 22 performs the control processing all over again (in Step S22). That is to say, the primary control circuit 22 performs the control processing (Step S22), the constant power control processing (Step S23), and the update processing (Step S24) in this order repeatedly. In the example illustrated in FIG. 5, after the update processing has been performed, the control processing is performed for the first period T1 from the time t2 through a time t3, and then the constant power control processing is performed for the second period T2 from the time t3 through a time t4. Also, in the example illustrated in FIG. 5, although the control processing, the constant power control processing, and the update processing will be performed in this order repeatedly from the time t4 on, the primary measured value is controlled to be constantly equal to the primary target value during each of the control processing and the constant power control processing. This is because the secondary measured value has already reached the secondary target value.

Furthermore, in this embodiment, the primary control circuit 22 monitors a variation in the primary measured value during each of the control processing and the constant power control processing. When finding that the primary measured value has varied to deviate from a predetermined range (of, e.g., ±5%) defined with respect to the primary target value as a median, the primary control circuit 22 decides that an error should have occurred and controls the primary circuit 21 to stop feeding power. Likewise, when finding the primary measured value greater than rated power (of, e.g., 3.7 kW), the primary control circuit 22 also decides that an error should have occurred and controls the primary circuit 21 to stop feeding power.

Next, it will be described how the contactless power feeding system 2 according to this embodiment operates in a situation where the primary control circuit 22 does not perform the constant power control processing. In performing the update processing, the primary control circuit 22 acquires the primary measured value and calculates the transfer efficiency based on the primary measured value thus acquired and the secondary measured value transmitted from the secondary control circuit 5. However, the secondary measured value is transmitted from the secondary control circuit 5 to the primary control circuit 22 at the regular transmission intervals TC1. That is to say, the delay before the primary control circuit 22 acquires the secondary measured value could be as long as the transmission interval TC1 at maximum since a point in time when the secondary control circuit 5 acquired the secondary measured value last time.

Thus, the secondary power for use in the update processing has already been acquired when the primary measured value is acquired. For that reason, attempting to calculate the transfer efficiency based on the primary measured value and secondary measured value, which have been acquired at respectively different points in time, during the update processing often causes failure to calculate the transfer efficiency accurately, thus possibly resulting in failure to calculate the primary target value accurately in the end. Also, even if the primary control circuit 22 attempts to control the primary circuit 21 in that case, the secondary measured value would not be settled at the secondary target value, but would vary significantly, during a transition period before the secondary measured value becomes equal to the secondary target value, thus taking some time to stabilize the secondary power as shown in FIG. 6A. In the example illustrated in FIG. 6A, performing the control processing and the update processing in this order from the time t10 on causes a variation in the secondary power until the secondary measured value is finally settled and stabilized at the secondary target value at a time t11. In FIG. 6A, the solid curve represents the secondary measured value and the one-dot chain line represents the secondary target value.

Thus, in the contactless power feeding system 2 according to this embodiment, the primary control circuit 22 is configured to perform the constant power control processing before performing the update processing. The constant power control processing is the processing of controlling the primary circuit 21 such that the primary measured value has a constant magnitude for a predetermined period. Therefore, according to this embodiment, during the second period T2 for performing the constant power control processing, the primary measured value has a constant magnitude, no matter at what point in time the primary measured value is acquired. For example, in the example illustrated in FIG. 5, the primary measured value acquired at the time t2 when the update processing is performed is equal to the primary measured value acquired at the time t1 that is earlier than the time t2. That is to say, as long as the primary control circuit 22 acquires the secondary measured value from the secondary control circuit 5 during the second period T2, then the primary control circuit 22 is allowed to calculate the transfer efficiency based on the primary measured value and the secondary measured value that have been acquired at substantially the same point in time. Note that even if no secondary measured values are acquired during the second period T2, the point in time when the primary measured value is acquired may still be substantially brought closer to the point in time when the secondary measured value is acquired, compared to a situation where no constant power control processing is performed.

Thus, the contactless power feeding system 2 according to this embodiment allows the primary control circuit 22 to calculate the transfer efficiency more accurately, and consequently, calculate the primary target value more accurately, compared to a situation where no constant power control processing is performed. In addition, in the contactless power feeding system 2 according to this embodiment, the primary control circuit's 22 controlling the primary circuit 21 quickly brings the secondary measured value into conformity with the secondary target value as shown in FIG. 6B, for example, thus shortening the amount of time it takes to stabilize the secondary power. In the example illustrated in FIG. 6B, performing the control processing, the constant power control processing, and the update processing in this order from the time t10 brings the secondary measured value into conformity with the secondary target value and stabilizes the secondary measured value at a time t12 before the time t11. In FIG. 6B, the solid curve represents the secondary measured value and the one-dot chain line represents the secondary target value.

In addition, in the contactless power feeding system 2 according to this embodiment, the primary control circuit 22 is configured to acquire the secondary measured value from the secondary control circuit 5 during a period in which the constant power control processing is performed (i.e., during the second period T2). Thus, this embodiment allows the primary control circuit 22 to calculate the transfer efficiency based on the primary measured value and secondary measured value that have been acquired at substantially the same point in time, facilitating accurate calculation of the transfer efficiency.

In particular, in the contactless power feeding system 2 according to this embodiment, the period in which the constant power control processing is performed (i.e., the second period T2) is longer than the transmission interval TC1 at which the secondary power is transmitted from the secondary control circuit 5. Therefore, this embodiment allows the primary control circuit 22 to acquire the secondary measured value at least once during the second period T2. For example, if the primary control circuit 22 has acquired a plurality of secondary measured values during the second period T2, it is recommended that the primary control circuit 22 perform the update processing based on the latest one of the plurality of secondary measured values. Note that the primary control circuit 22 may or may not be configured to acquire the secondary measured value during the second period T2.

Furthermore, in the contactless power feeding system 2 according to this embodiment, the primary control circuit 22 is configured to perform the constant power control processing after having performed the control processing. This allows the contactless power feeding system 2 according to this embodiment to bring, as soon as the primary target value is updated, the primary measured value into conformity with the primary target value updated. Note that the primary control circuit 22 may or may not perform the constant power control processing after having performed the control processing. Alternatively, the primary control circuit 22 may perform the constant power control processing before performing the control processing.

Furthermore, in the contactless power feeding system 2 according to this embodiment, the primary control circuit 22 is configured to monitor a variation in the primary measured value during a period in which the constant power control processing is performed (i.e., during the second period T2). This allows the contactless power feeding system 2 according to this embodiment to quickly respond to a variation in the primary power involved with, for example, a variation in loads or a variation in the coefficient of coupling between the power feeding coil 31 and the power receiving coil 41, even while performing the constant power control processing. Note that the primary control circuit 22 may or may not monitor a variation in the primary measured value while performing the constant power control processing.

In the contactless power feeding system 2 according to each of the first and second embodiments, the primary control circuit 22 performs, during the update processing, the processing of calculating the transfer efficiency based on the primary measured value and the secondary measured value and the processing of calculating the primary target value based on the transfer efficiency and the secondary target value. However, this is only an example and should not be construed as limiting. Alternatively, the primary control circuit 22 may perform any other type of processing. For example, the primary control circuit 22 may perform, during the update processing, the processing of directly calculating the primary target value based on the primary measured value, the secondary measured value, and the secondary target value with the intervening processing of calculating the transfer efficiency omitted. This processing may also be called a type of processing of calculating the primary target value based on the transfer efficiency to be determined by the primary measured value and the secondary measured value and on the secondary target value.

Furthermore, in the contactless power feeding system 2 according to each of the first and second embodiments described above, the primary circuit 21 may include a power correction circuit. The power correction circuit may be provided between the inverter circuit 212 and the capacitor 32 (or the capacitor 33) and configured to adjust the magnitude of the primary power to be output by the power feeding coil 31. The power correction circuit may be made up of a capacitor and a plurality of switching elements. The power correction circuit is configured to increase or decrease a charging voltage supplied from the capacitor to the power feeding coil 31 by controlling the plurality of switching elements. In that case, the primary control circuit 22 may also perform feedback control of the primary power not only by controlling the PFC circuit 211 and the inverter circuit 212 but also by controlling the plurality of switching elements of the power correction circuit.

Also, the contactless power feeding system 2 according to each of the first and second embodiments only needs to include the primary circuit 21 and the primary control circuit 22. That is to say, the contactless power feeding system 2 according to each of the first and second embodiments does not have to include the power feeding unit 3 and may include no secondary-side devices such as the power receiving unit 4 and the secondary control circuit 5.

As is clear from the foregoing description of embodiments, a contactless power feeding system (2) according to a first aspect of the present invention includes a primary circuit (21) and a primary control circuit (22). The primary circuit (21) supplies primary power to a power feeding coil (31). The primary control circuit (22) controls the primary circuit (21). The primary control circuit (22) is configured to acquire a primary measured value as a measured value of the primary power. The primary control circuit (22) is configured to acquire a secondary measured value and a secondary target value from a secondary control circuit (5). The secondary measured value is a measured value of secondary power received by a power receiving coil (41) to be electromagnetically coupled to the power feeding coil (31). The secondary target value is a target value of the secondary power. The primary control circuit (22) is configured to perform control processing and update processing alternately and repeatedly. The control processing is processing of controlling the primary circuit (21) to bring the primary measured value into conformity with a primary target value that is a target value of the primary power. The update processing is processing of updating the primary target value. The update processing includes calculating the primary target value based on transfer efficiency to be determined by the primary measured value and the secondary measured value and on the secondary target value.

In a contactless power feeding system (2) according to a second aspect of the present invention, which may be realized in combination with the first aspect, the primary control circuit (22) is configured to perform pre-processing before performing the control processing for the first time since power has started to be fed from the power feeding coil (31) to the power receiving coil (41). The pre-processing is processing of calculating the primary target value with the transfer efficiency set at an initial value.

In a contactless power feeding system (2) according to a third aspect of the present invention, which may be realized in combination with the first or second aspect, the primary control circuit (22) is configured to perform constant power control processing before performing the update processing. The constant power control processing is processing of controlling the primary circuit (21) for a predetermined period of time such that the primary measured value has a constant magnitude.

In a contactless power feeding system (2) according to a fourth aspect of the present invention, which may be realized in combination with the third aspect, the primary control circuit (22) is configured to acquire the secondary measured value from the secondary control circuit (5) during a period in which the constant power control processing is performed.

In a contactless power feeding system (2) according to a fifth aspect of the present invention, which may be realized in combination with the fourth aspect, the period for which the constant power control processing is performed is longer than a transmission interval (TC1) at which the secondary measured value is transmitted intermittently from the secondary control circuit (5).

In a contactless power feeding system (2) according to a sixth aspect of the present invention, which may be realized in combination with any one of the third to fifth aspects, the primary control circuit (22) is configured to perform the constant power control processing after having performed the control processing.

In a contactless power feeding system (2) according to a seventh aspect of the present invention, which may be realized in combination with any one of the third to sixth aspects, the primary control circuit (22) is configured to monitor a variation in the primary measured value during a period in which the constant power control processing is performed.

A contactless power feeding system (2) according to an eighth aspect of the present invention, which may be realized in combination with any one of the first to seventh aspects, further includes a primary measuring unit (23) configured to measure the primary power. The primary control circuit (22) is configured to acquire the primary measured value from the primary measuring unit (23).

A contactless power transfer system (1) according to a ninth aspect of the present invention includes the contactless power feeding system (2) according to any one of the first to eighth aspects, a power feeding coil (31), a power receiving coil (41), and a secondary control circuit (5). The power feeding coil (31) is supplied with the primary power. The power receiving coil (41) is electromagnetically coupled to the power feeding coil (31). The secondary control circuit (5) is configured to acquire a secondary measured value as a measured value of secondary power to be supplied to the power receiving coil (41). The secondary control circuit (5) is configured to transmit the secondary measured value and a secondary target value to the primary control circuit (22). The secondary target value is a target value of the secondary power.

A contactless power transfer system (1) according to a tenth aspect of the present invention, which may be realized in combination with the ninth aspect, further includes a secondary measuring unit 45 configured to measure the secondary power. The secondary control circuit (5) is configured to acquire the secondary measured value from the secondary measuring unit (45).

The contactless power feeding system (2) and contactless power transfer system (1) described above allow a secondary measured value to be quickly brought closer to a secondary target value.

REFERENCE SIGNS LIST

1 Contactless Power Transfer System
2 Contactless Power Feeding System
21 Primary Circuit
22 Primary Control Circuit
23 Measuring Unit (Primary Measuring Unit)
31 Power Feeding Coil
41 Power Receiving Coil
45 Measuring Unit (Secondary Measuring Unit)
5 Secondary Control Circuit
TC1 Transmission Interval

The invention claimed is:

1. A contactless power feeding system comprising:
    a primary circuit configured to supply primary power to a power feeding coil; and
    a primary control circuit configured to control the primary circuit,
    the primary control circuit being configured to acquire a primary measured value as a measured value of the primary power, wherein:
    the primary control circuit is configured to acquire a secondary measured value and a secondary target value from a secondary control circuit, the secondary measured value being a measured value of secondary power received by a power receiving coil to be electromagnetically coupled to the power feeding coil, the secondary target value being a target value of the secondary power,
    the primary control circuit is configured to alternately and repeatedly perform:
        control processing of controlling the primary circuit to bring the primary measured value into conformity with a primary target value that is a target value of the primary power; and
        update processing of updating the primary target value,
    the update processing includes processing of calculating the primary target value based on transfer efficiency to be determined by the primary measured value and the secondary measured value and on the secondary target value,
    the primary control circuit is configured to perform, before performing the update processing, constant power control processing, the constant power control processing including controlling the primary circuit for a predetermined period of time such that the primary measured value is kept constant at the primary target value yet to be updated, and
    the primary control circuit is configured to acquire the secondary measured value from the secondary control circuit during a period in which the constant power control processing is performed.

2. The contactless power feeding system of claim 1, wherein
    the primary control circuit is configured to perform, before performing the control processing for the first time since power has started to be fed from the power feeding coil to the power receiving coil, pre-processing of calculating the primary target value with the transfer efficiency set at an initial value.

3. The contactless power feeding system of claim 1, wherein
    the period for which the constant power control processing is performed is longer than a transmission interval at which the secondary measured value is transmitted intermittently from the secondary control circuit.

4. The contactless power feeding system of claim 1, wherein
    the primary control circuit is configured to perform the constant power control processing after having performed the control processing.

5. The contactless power feeding system of claim 1, wherein
    the primary control circuit is configured to monitor a variation in the primary measured value during a period in which the constant power control processing is performed.

6. The contactless power feeding system of claim 1; further comprising a primary measuring unit configured to measure the primary power, wherein the primary control circuit is configured to acquire the primary measured value from the primary measuring unit.

7. A contactless power transfer system comprising:

the contactless power feeding system of claim 1;

a power feeding coil configured to be supplied with the primary power;

a power receiving coil configured to be electromagnetically coupled to the power feeding coil; and a secondary control circuit configured to acquire a secondary measured value as a measured value of secondary power to be supplied to the power receiving coil, the secondary control circuit being configured to transmit the secondary measured value and a secondary target value to the primary control circuit, the secondary target value being a target value of the secondary power.

8. The contactless power transfer system of claim 7, further comprising a secondary measuring unit configured to measure the secondary power, wherein the secondary control circuit is configured to acquire the secondary measured value from the secondary measuring unit.

* * * * *